(12) United States Patent
Ofuji et al.

(10) Patent No.: US 8,670,431 B2
(45) Date of Patent: Mar. 11, 2014

(54) BASE STATION, USER TERMINAL, AND TRANSMISSION CONTROL METHOD FOR SOUNDING REFERENCE SIGNAL

(75) Inventors: Yoshiaki Ofuji, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1202 days.

(21) Appl. No.: 12/521,980

(22) PCT Filed: Dec. 27, 2007

(86) PCT No.: PCT/JP2007/075175
§ 371 (c)(1),
(2), (4) Date: Sep. 9, 2009

(87) PCT Pub. No.: WO2008/084721
PCT Pub. Date: Jul. 17, 2008

(65) Prior Publication Data
US 2010/0040036 A1 Feb. 18, 2010

(30) Foreign Application Priority Data
Jan. 9, 2007 (JP) .................................. 2007-001854

(51) Int. Cl.
*H04B 7/208* (2006.01)
*H04J 1/00* (2006.01)
(52) U.S. Cl.
USPC .......................................... 370/344; 370/343
(58) Field of Classification Search
USPC ....................................................... 370/344
See application file for complete search history.

(56) References Cited

U.S. PATENT DOCUMENTS

| 6,388,997 | B1 * | 5/2002 | Scott ............................. 370/280 |
| 2002/0071052 | A1 * | 6/2002 | Itoh et al. ................... 348/384.1 |

FOREIGN PATENT DOCUMENTS

| EP | 1 865 638 A1 | 12/2007 |
| EP | 2 037 693 A1 | 3/2009 |
| WO | 2006/109492 A1 | 10/2006 |
| WO | 2007/148590 A1 | 12/2007 |

OTHER PUBLICATIONS

International Search Report for PCT/JP2007/075175 mailed Apr. 8, 2008 (9 pages).

(Continued)

*Primary Examiner* — Shripal Khajuria
(74) *Attorney, Agent, or Firm* — Osha Liang LLP

(57) ABSTRACT

A disclosed base station is used in a radio communication system where sounding reference signals from user terminals are multiplexed using distributed FDMA in which distributed frequency blocks each including frequency subcarriers discretely distributed in a system bandwidth are allocated to the user terminals, and the system bandwidth is repeatedly halved into frequency band segments according to a binary-tree structure. The base station includes a transmission bandwidth determining unit for determining transmission bandwidths to be allocated to the respective user terminals for transmission of the sounding reference signals based on path losses between the user terminals and the base station; a transmission frequency determining unit for allocating the frequency band segments corresponding to the determined transmission bandwidths as transmission frequency bands for the sounding reference signals; and a transmission method reporting unit for reporting the transmission bandwidths and the transmission frequency bands to the respective user terminals.

12 Claims, 9 Drawing Sheets

(56) References Cited

OTHER PUBLICATIONS

"Frequency Domain Channel-Dependent Scheduling Employing an Adaptive Transmission Bandwidth for Pilot Channel in Uplink Single-Carrier-FDMA Radio Access" Author(s): Yoshiaki Ofuji et al. Published May 7-10, 2006, Vehicular Technology Conference, 2006 VTC 2006-Spring, IEEE 63rd vol. 1, pp. 334-338 (6 pages).

"Single Carrier FDMA O Mochiiru Evolved Utra Nobori Link ni Okeru FDMA to CDMA o Heiyo suru Chokko Pilot Channel" Author(s): Teruo Kawamura et al. Published Jul. 12, 2006, IEICE Technical Report RCS 2006-104 vol. 106, No. 168, The Institute of Electronics, Information and Communication Engineers, Jul. 12, 2006; pages.

3GPP TR 25.814 V7.0.0; Jun. 2006 3rd Generation Partnership Project; Technical Specification Group Radio Access Network; "Physical Layer Aspects for Evolved Universal Terrestrial Radio Access (UTRA)" (Release 7); (126 pages).

Written Opinion of ISA mailed Apr. 8, 2008 (3 pages).

\* cited by examiner

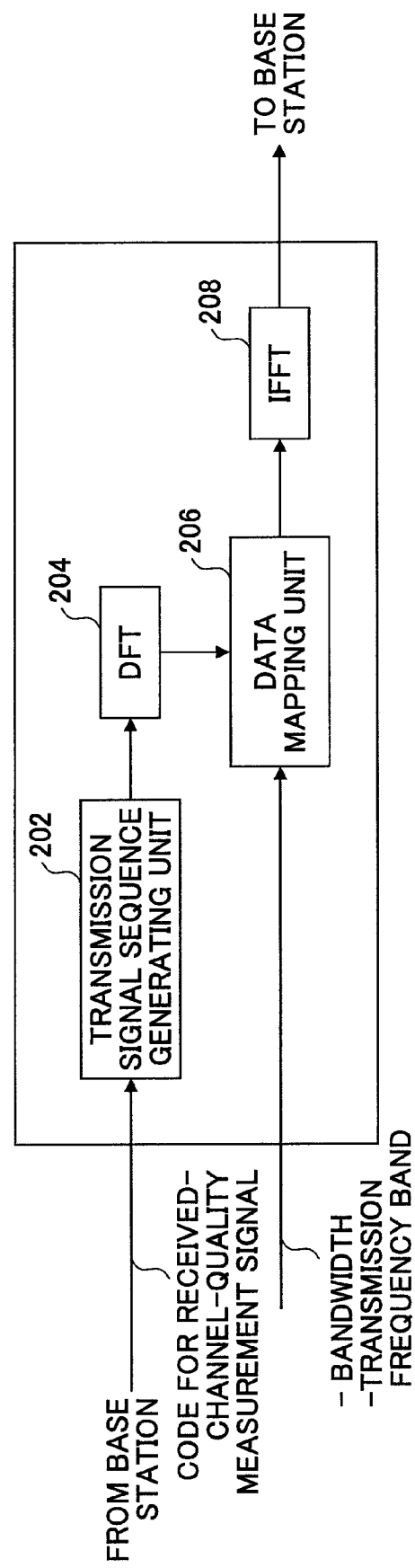

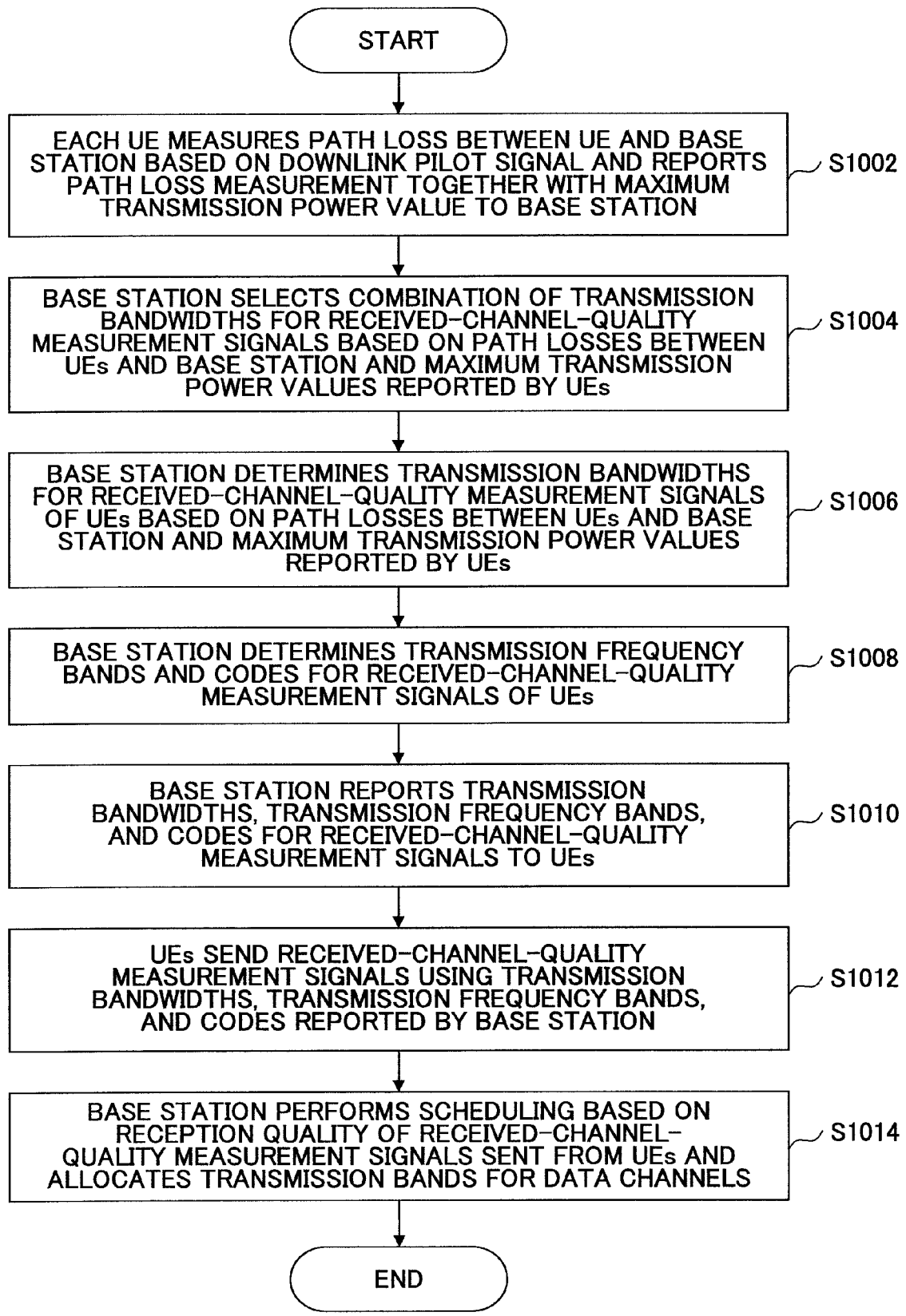

BASE STATION, USER TERMINAL, AND TRANSMISSION CONTROL METHOD FOR SOUNDING REFERENCE SIGNAL

TECHNICAL FIELD

The present invention generally relates to a Long Term Evolution (LTE) system. More particularly, the present invention relates to a base station, a user terminal, and a transmission control method for a sounding reference signal.

BACKGROUND ART

A successor communication method to W-CDMA and HSDPA, i.e., Long Term Evolution (LTE) (also called Evolved UTRA and UTRAN or Super 3G), is currently being discussed by 3GPP that is a standardization group for W-CDMA. In 3GPP, orthogonal frequency division multiplexing (OFDM) has been proposed as a downlink radio access method and single-carrier frequency division multiple access (SC-FDMA) has been proposed as an uplink radio access method (see, for example, 3GPP TR 25.814 (V7.0.0), "Physical Layer Aspects for Evolved UTRA," June 2006).

In OFDM, a frequency band is divided into multiple narrower frequency bands (subcarriers) and data are transmitted on the subcarriers. The subcarriers are densely arranged along the frequency axis such that they partly overlap each other but do not interfere with each other. This approach enables high-speed transmission and improves frequency efficiency.

In SC-FDMA, a frequency band is divided into narrower frequency bands and the narrower frequency bands are allocated to different terminals for transmission. This approach makes it possible to reduce interference between terminals. Also, SC-FDMA reduces variation of the transmission power and therefore makes it possible to reduce power consumption of terminals and to achieve wide coverage.

In a frequency scheduling method that employs propagation path fluctuations in the frequency domain caused by frequency selective fading, data are transmitted using frequency bands with good reception conditions and therefore user terminals are requested to send wideband signals for the measurement of received-channel quality. For example, in E-UTRA uplink, transmission bands are allocated to data channels taking into account the frequency selectivity of received channels and each user terminal (UE) is requested to send a wideband pilot signal called a sounding reference signal (SRS) for measuring the uplink received channel quality.

However, when a UE located away from the base station is to transmit a wideband sounding reference signal, the transmission power is limited. Therefore, the received power of the sounding reference signal at the base station becomes low and the accuracy in measuring the received channel quality is reduced.

In a method proposed to cope with this problem, the transmission bandwidth for the sounding reference signal is adaptively adjusted according to the distance, i.e., a path loss, between the UE and the base station. Meanwhile, the following two methods for multiplexing sounding reference signals with different bandwidths have been proposed:

Multiplexing method using distributed FDMA (FIG. 1)
    Multiplexing method where sounding reference signals are classified into groups by bandwidths and the grouped signals are multiplexed using localized FDMA (FIG. 2).

In both methods, sounding reference signals with the same bandwidths are multiplexed by CDMA.

DISCLOSURE OF INVENTION

Problems to be Solved by the Invention

However, the above background art technologies have problems as described below.

For example, after transmission bands are allocated to some narrowband sounding reference signals, in some cases, it becomes impossible to allocate a transmission band to a sounding reference signal with a different bandwidth. FIG. 3 shows an example where frequency bands narrower than a system bandwidth are allocated as transmission bands for sounding reference signals. In FIG. 3, it is assumed that one eighth of the system bandwidth is to be allocated to each of UE1 and UE2 and one half of the system bandwidth is to be allocated to UE3 as transmission bands for sounding reference signals. In this case, if transmission bands that are apart from each other by one half of the system bandwidth are allocated to UE1 and UE2, respectively, it becomes impossible to allocate a half-system transmission band to UE3.

To prevent this problem, it is necessary to increase the subcarrier interval for sounding reference signals. As shown in FIG. 4, the subcarrier interval increases as the number of different bandwidths to be multiplexed increases.

However, increasing the subcarrier interval decreases transmission power density per unit bandwidth and decreases power density of a received signal at the base station, thus reducing the accuracy in measuring received channel conditions. Also, increasing the subcarrier interval decreases the number of code sequences used to multiply and thereby to separate sounding reference signals to be sent by users.

One object of the present invention is to solve or reduce one or more of the above problems and to provide a base station, a user terminal, and a transmission control method for a sounding reference signal that make it possible to efficiently allocate transmission bands for sounding reference signals.

Means for Solving the Problems

An aspect of the present invention provides a base station used in a system where sounding reference signals from user terminals are multiplexed using distributed FDMA in which distributed frequency blocks each including frequency subcarriers discretely distributed in a system bandwidth are allocated to the user terminals, and the system bandwidth is repeatedly halved into frequency band segments according to a binary-tree structure. The base station includes a transmission bandwidth determining unit configured to determine transmission bandwidths to be allocated to the respective user terminals for transmission of the sounding reference signals based on path losses between the user terminals and the base station reported by the user terminals; a transmission frequency determining unit configured to allocate the frequency band segments corresponding to the determined transmission bandwidths as transmission frequency bands for the sounding reference signals; and a transmission method reporting unit configured to report the transmission bandwidths and the transmission frequency bands to the respective user terminals.

In a system where sounding reference signals to be transmitted from user terminals are multiplexed using distributed FDMA in which distributed frequency blocks each including frequency subcarriers discretely distributed in a system bandwidth are allocated to the user terminals, the above configuration makes it possible to allocate frequency band segments obtained by repeatedly halving the system bandwidth according to a binary-tree structure as transmission frequency bands for the sounding reference signals.

Another aspect of the present invention provides a user terminal used in a system where a sounding reference signal from the user terminal is multiplexed using distributed FDMA in which a distributed frequency block including frequency subcarriers discretely distributed in a system bandwidth is allocated to the user terminal, the system bandwidth is repeatedly halved into frequency band segments according to a binary-tree structure, a transmission bandwidth to be allocated to the user terminal for transmission of the sounding reference signal is determined based on a path loss between the user terminal and a base station reported by the user terminal, and one of the frequency band segments corresponding to the determined transmission bandwidth is allocated as a transmission frequency band for the sounding reference signal. The user terminal includes a data mapping unit configured to map a sounding reference signal sequence to subcarriers based on the transmission bandwidth and the transmission frequency band reported by the base station.

In a system where sounding reference signals to be transmitted from user terminals are multiplexed using distributed FDMA in which distributed frequency blocks each including frequency subcarriers discretely distributed in a system bandwidth are allocated to the user terminals and where the system bandwidth is repeatedly halved into frequency band segments according to a binary-tree structure, the above configuration makes it possible to transmit a sounding reference signal using one of the frequency band segments as a transmission frequency band.

Another aspect of the present invention provides a method of controlling transmission of sounding reference signals in a system where the sounding reference signals from user terminals are multiplexed using distributed FDMA in which distributed frequency blocks each including frequency subcarriers discretely distributed in a system bandwidth are allocated to the user terminals, and the system bandwidth is repeatedly halved into frequency band segments according to a binary-tree structure. The method includes a reception step of receiving measurements of path losses between the user terminals and a base station from the user terminals; a transmission bandwidth determining step of determining transmission bandwidths to be allocated to the respective user terminals for transmission of the sounding reference signals based on the measurements of the path losses; a transmission frequency determining step of allocating the frequency band segments corresponding to the determined transmission bandwidths as transmission frequency bands for the sounding reference signals; and a transmission method reporting step of reporting the transmission bandwidths and the transmission frequency bands to the respective user terminals.

In a system where sounding reference signals to be transmitted from user terminals are multiplexed using distributed FDMA in which distributed frequency blocks each including frequency subcarriers discretely distributed in a system bandwidth are allocated to the user terminals, the above configuration makes it possible to allocate frequency band segments obtained by repeatedly halving the system bandwidth according to a binary-tree structure as transmission frequency bands for the sounding reference signals.

Advantageous Effect of the Invention

Aspects of the present invention provide a base station, a user terminal, and a transmission control method for a sounding reference signal that make it possible to efficiently allocate transmission bands for sounding reference signals.

BRIEF DESCRIPTION OF THE DRAWINGS

FIG. 9 is a partial block diagram illustrating a user terminal according to an embodiment of the present invention; and FIG. 10 is a flowchart showing a process in a radio communication system according to an embodiment of the present invention.

EXPLANATION OF REFERENCES

Figure 1:
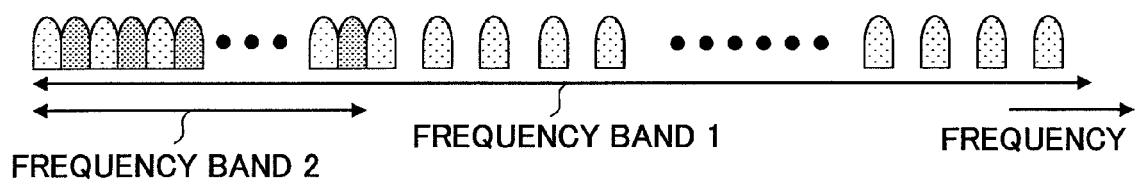
FIG. 1 is a drawing illustrating a method of multiplexing sounding reference signals with different bandwidths.
Figure 2:
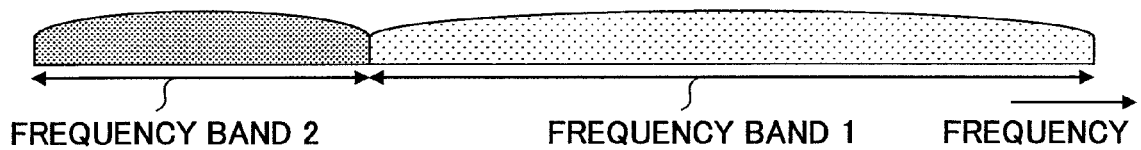
FIG. 2 is a drawing illustrating another method of multiplexing sounding reference signals with different bandwidths.
Figure 3:
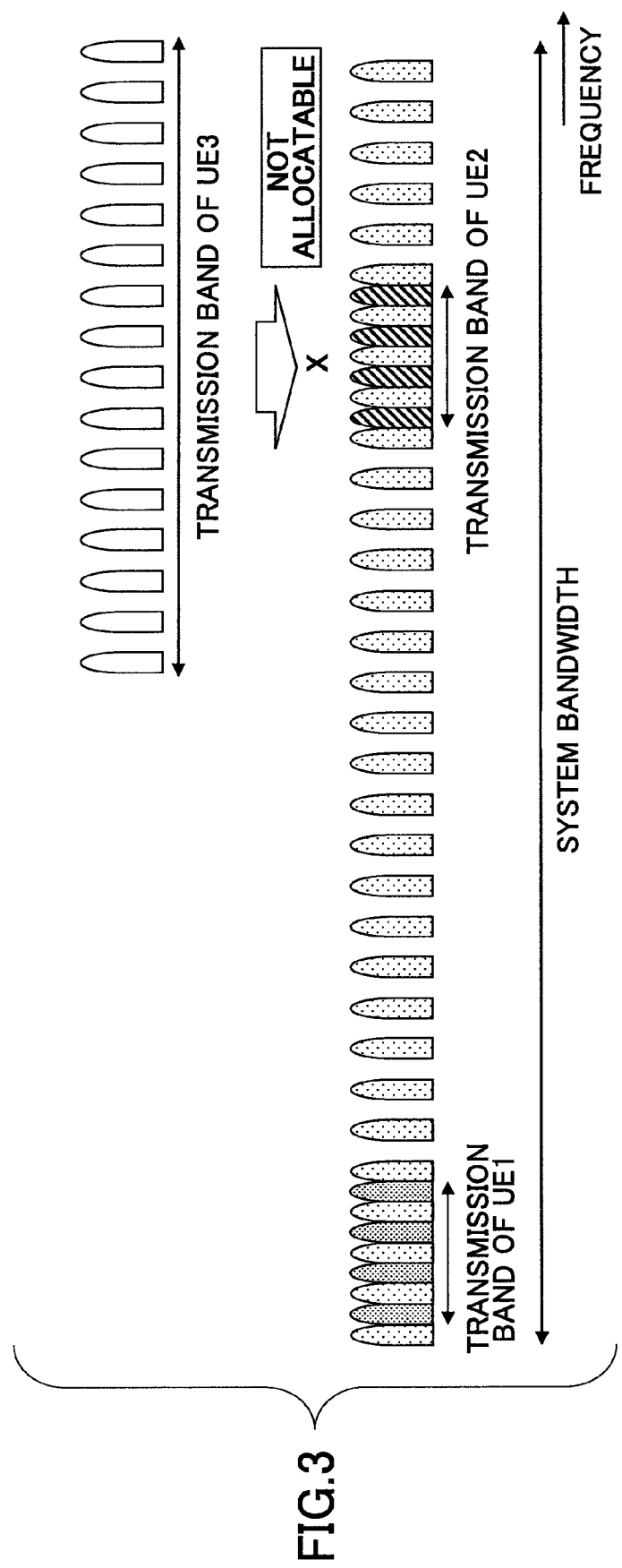
FIG. 3 is a drawing used to describe a problem in allocating transmission bands for sounding reference signals.
Figure 4:
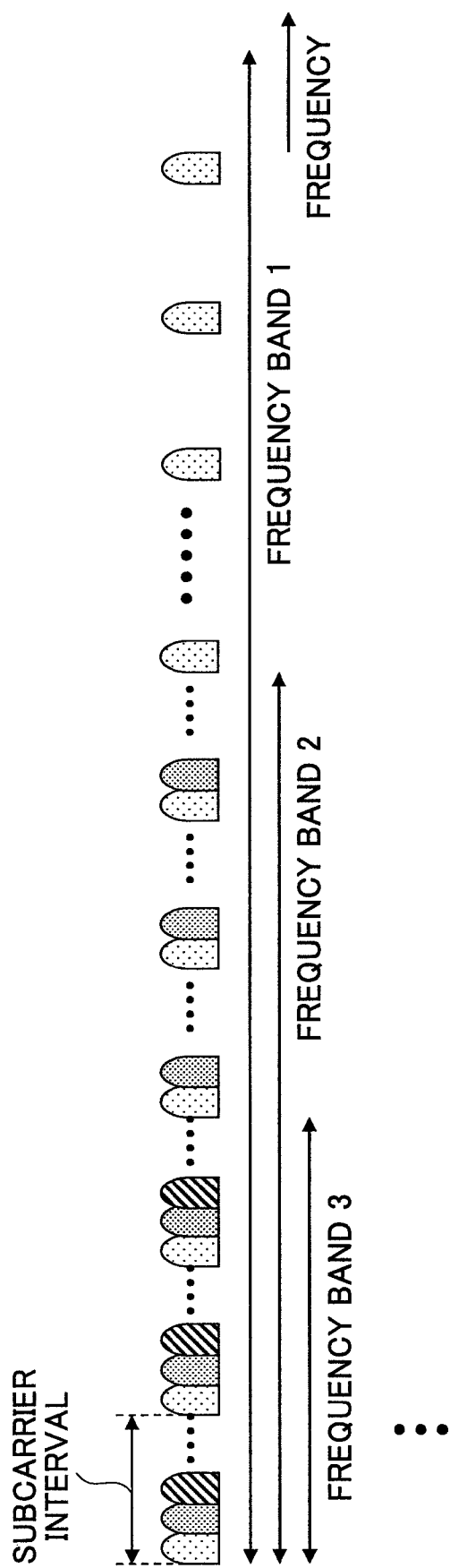
FIG. 4 is a drawing used to describe another problem in allocating transmission bands for sounding reference signals.

100 Base station
102 Transmission bandwidth determining unit
104 Transmission frequency determining unit
106 Transmission frequency management unit
108 Code assignment unit
110 Code management unit
112 Transmission bandwidth control unit
200 User terminal
202 Transmission signal sequence generating unit
204 Discrete Fourier transform (DFT) unit
206 Data mapping unit
208 Inverse fast Fourier transform (IFFT) unit

BEST MODE FOR CARRYING OUT THE INVENTION

Preferred embodiments of the present invention are described below with reference to the accompanying drawings.

Throughout the accompanying drawings, the same reference numbers are used for parts having the same functions, and overlapping descriptions of those parts are omitted.

A radio communication system according to an embodiment of the present invention is described below.

The radio communication system of this embodiment is based on Long Term Evolution (LTE) (also called Evolved UTRA and UTRAN or Super 3G).

As described above, OFDM is used as the downlink radio access method and SC-FDMA is used as the uplink radio access method. In OFDM, a frequency band is divided into multiple narrow frequency bands (subcarriers) and data are transmitted on the subcarriers. In SC-FDMA, a frequency band is divided into narrower frequency bands and the narrower frequency bands are allocated to different terminals for transmission. Thus, SC-FDMA makes it possible to reduce interference between terminals.

Figure 5:
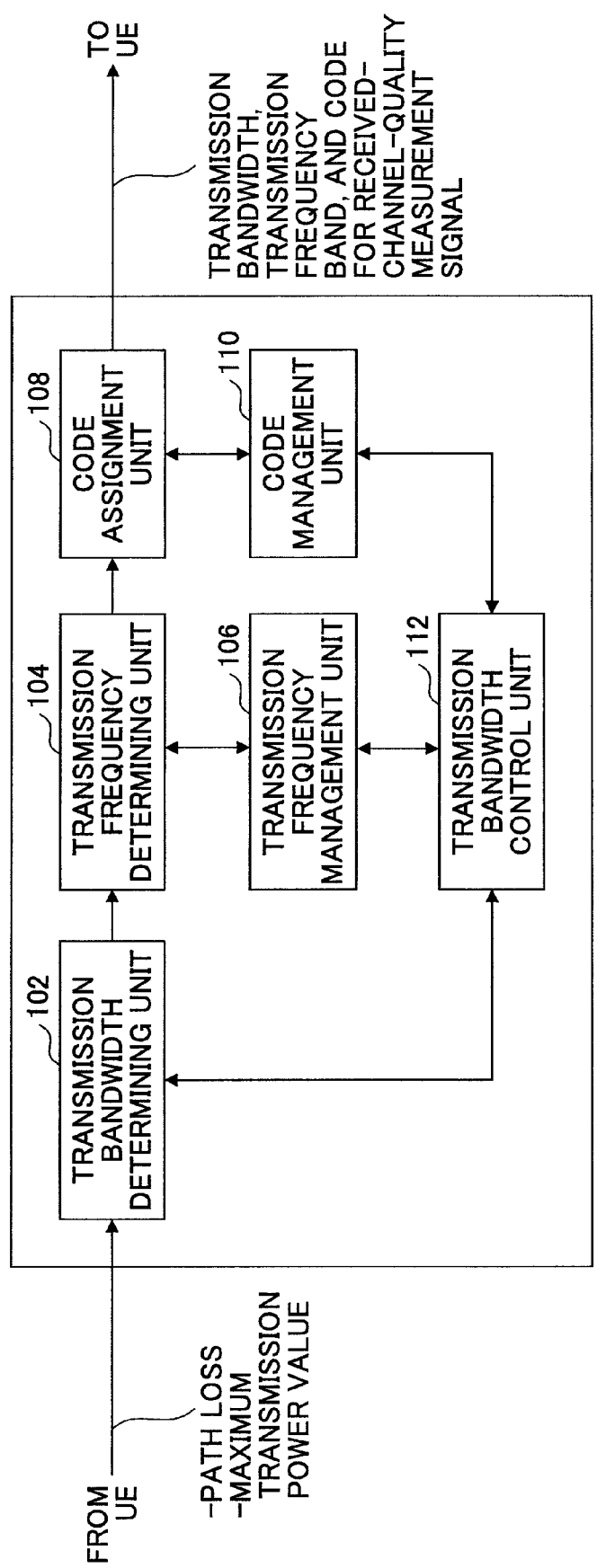
FIG. 5 is a partial block diagram illustrating a base station according to an embodiment of the present invention.

Next, a base station 100 of this embodiment is described with reference to FIG. 5.

The base station 100 includes a transmitting device. The transmitting device includes a transmission bandwidth determining unit 102 that receives path loss measurements and maximum transmission power levels from user terminals 200; a transmission frequency determining unit 104 that receives an output signal from the transmission bandwidth determining unit 102; a transmission frequency management unit 106 connected to the transmission frequency determining unit 104; a code assignment unit 108 that receives an output signal from the transmission frequency determining unit 104; a code management unit 110 connected to the code assignment unit 108; and a transmission bandwidth control unit 112 connected to the transmission bandwidth determining unit 102, the transmission frequency management unit 106, and the code management unit 110.

In this embodiment, sounding reference signals to be transmitted from user terminals are multiplexed using distributed FDMA where distributed frequency blocks each including frequency subcarriers discretely distributed in the system bandwidth are allocated to the user terminals.

The transmission bandwidth determining unit 102 determines transmission bandwidths for sounding reference signals to be transmitted by the user terminals 200. The transmission bandwidths for the sounding reference signals are determined, for example, based on the distances between the base station 100 and the respective user terminals 200.

For example, the transmission bandwidth determining unit 102 allocates wide transmission bandwidths to users located near the base station 100, and allocates narrower transmission bandwidths to users other than those located near the base station 100. More specifically, the transmission bandwidth determining unit 102 determines the transmission bandwidths for the sounding reference signals based on path losses and/or maximum transmission power levels reported by the user terminals 200.

When a user terminal 200 sends a sounding reference signal using a wide transmission band, the transmission power per unit bandwidth becomes low. As a result, the reception level of the sounding reference signal at the base station 100 becomes low and the measurement accuracy is reduced. If the base station 100 is configured to select user terminals whose sounding reference signals are received with good reception levels, only a limited number of user terminals can transmit sounding reference signals using wide transmission bands.

For this reason, the base station 100 allows user terminals with extra transmission power to send the sounding reference signals at wide intervals in the frequency domain, i.e., using wide transmission bands. The transmission bandwidth determining unit 102 estimates a transmission power level necessary to achieve predetermined reception quality based on a path loss reported by each user terminal, and determines whether the difference between the maximum transmission power level and the estimated transmission power level is greater than or equal to a predetermined threshold. If the difference is greater than or equal to the threshold, the transmission bandwidth determining unit 102 determines a transmission bandwidth for the sounding reference signal of the user terminal. For example, the transmission bandwidth determining unit 102 allocates a transmission bandwidth represented by $BW_0/2^n$ (where $BW_0$ indicates a system bandwidth and "n" indicates an integer greater than 0).

The transmission frequency determining unit 104 determines transmission frequency bands for the sounding reference signals based, for example, on the transmission bandwidths determined by the transmission bandwidth determining unit 102. For example, the transmission frequency determining unit 104 determines transmission frequency bands for the sounding reference signals by referring to a frequency band allocation status recorded in the transmission frequency management unit 106 described later.

In the base station 100 of this embodiment, transmission bands are allocated to sounding reference signals with different bandwidths determined by the transmission bandwidth determining unit 102 according to an allocation method similar to orthogonal variable spreading factor code (OVSF) allocation. This approach makes it possible to efficiently allocate transmission bands to sounding reference signals such that unused frequency bands in the system bandwidth are reduced. This approach also makes it possible to reduce the subcarrier interval for sounding reference signals, to improve the accuracy in measuring received channel conditions, and to prevent reduction in the number of code sequences used to multiply and thereby to separate sounding reference signals to be sent by users.

Figure 6:
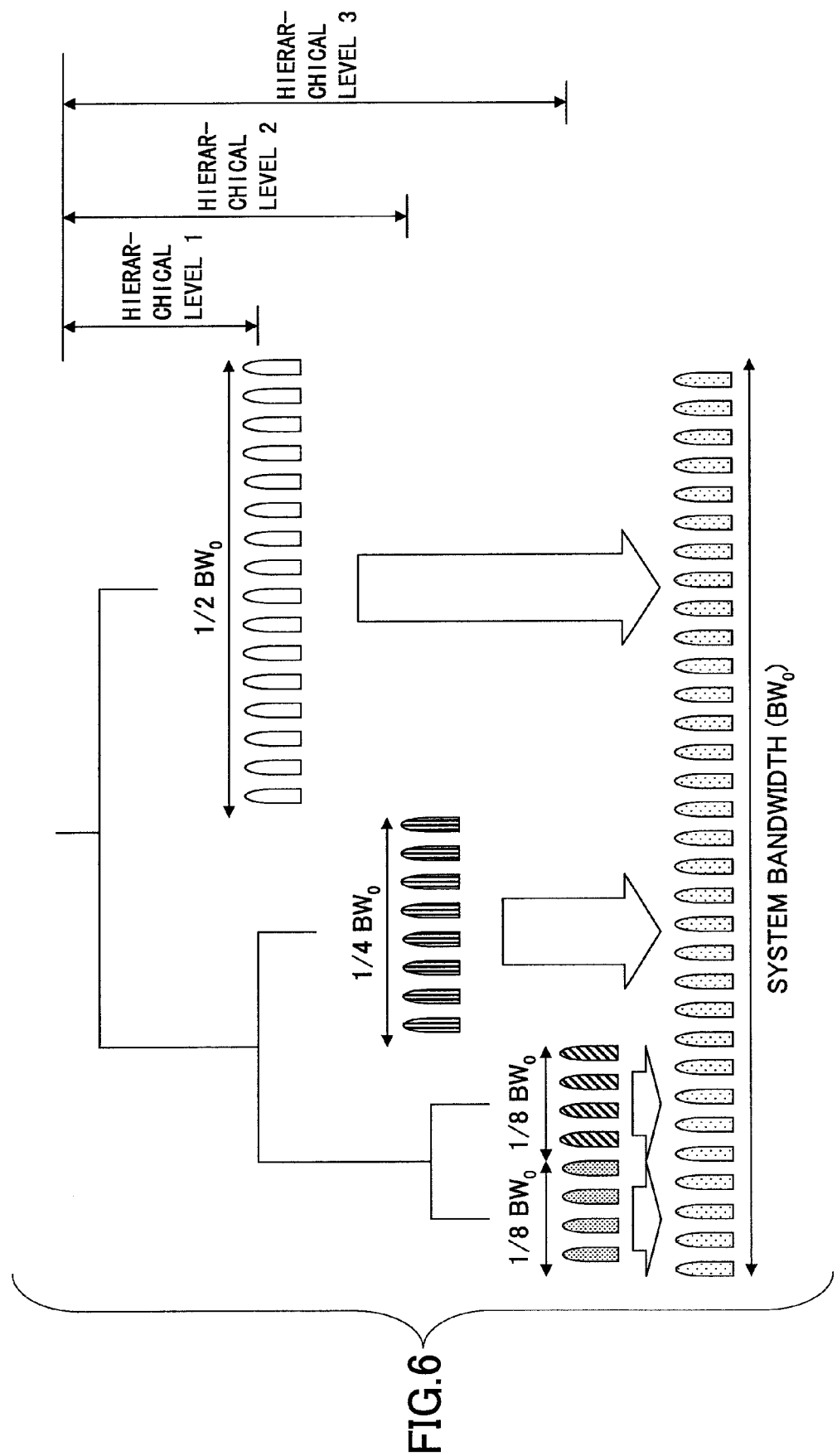
FIG. 6 is a drawing illustrating a method of allocating transmission bands for sounding reference signals according to an embodiment of the present invention.

For example, as shown in FIG. 6, the system bandwidth ($BW_0$) is divided into multiple frequency band segments using a tree structure. In this example, based on a binary-tree structure, the system bandwidth is divided into two frequency band segments and at least one of the two frequency band segments is further divided into two. In other words, at least one of each pair of frequency band segments is further divided into two and this step is repeated. In a binary tree, each node has at most two children. This means that if all frequency band segments are repeatedly divided into two until the hierarchical level in the binary tree structure reaches "n" (n indicates an integer greater than 0), the system bandwidth ($BW_0$) is divided into frequency band segments with a bandwidth of $BW_0/2^n$. The number of hierarchical levels of either one of the subtrees can be increased first. In the example shown in FIG. 6, the number of hierarchical levels of the left subtree is increased first.

The transmission frequency determining unit 104 allocates transmission frequency bands corresponding to the same hierarchical level of the binary tree structure to the sounding reference signals of user terminals that are allocated the same bandwidth by the transmission bandwidth determining unit 102. For example, as shown in FIG. 6, the transmission frequency determining unit 104 allocates a transmission frequency band corresponding to the hierarchical level 3 to a user terminal that is allocated a bandwidth of $BW_0/8$ by the transmission bandwidth determining unit 102.

FIG. 6 is provided just as an example. The number of hierarchical levels may be increased according to determined transmission bandwidths, and the number of hierarchical levels of the right subtree may be increased first.

The user terminal 200 transmits the sounding reference signal using the allocated transmission frequency band. The base station 100 performs frequency scheduling based on the reception quality of sounding reference signals and allocates a transmission band to each data channel within the range of the transmission frequency band of the sounding reference signal sent from the corresponding user terminal.

The transmission frequency management unit 106 manages the allocation status of frequency bands allocated by the transmission frequency determining unit 104. For example, the transmission frequency management unit 106 receives a combination of bandwidths for the sounding reference signals from the transmission bandwidth control unit 112. The transmission frequency management unit 106 manages the current usage status and users of the received combination of frequency bands.

The code assignment unit 108 determines codes for the sounding reference signals. For example, the code assignment unit 108 assigns codes such that the sounding reference signals of user terminals are orthogonalized on the frequency axis. Also, the code assignment unit 108 reports the transmission bandwidths, the transmission frequency bands, and the codes for the sounding reference signals to the respective user terminals 200.

The code management unit 110 manages the assignment status of codes for the sounding reference signals. In other words, the code management unit 110 manages the usage status of codes.

The transmission bandwidth control unit 112 selects a combination of bandwidths to be allocated to the sounding reference signals based on the distribution of path losses between the user terminals 200 and the base station 100. The selected combination is sent to the transmission frequency management unit 106. In this embodiment, it is assumed that two combinations of bandwidths are provided for sounding reference signals. One of the two combinations of bandwidths for sounding reference signals is used when the number of user terminals with high path losses is small, and the other one of the two combinations is used when the number of user terminals with high path losses is large.

Figure 7:
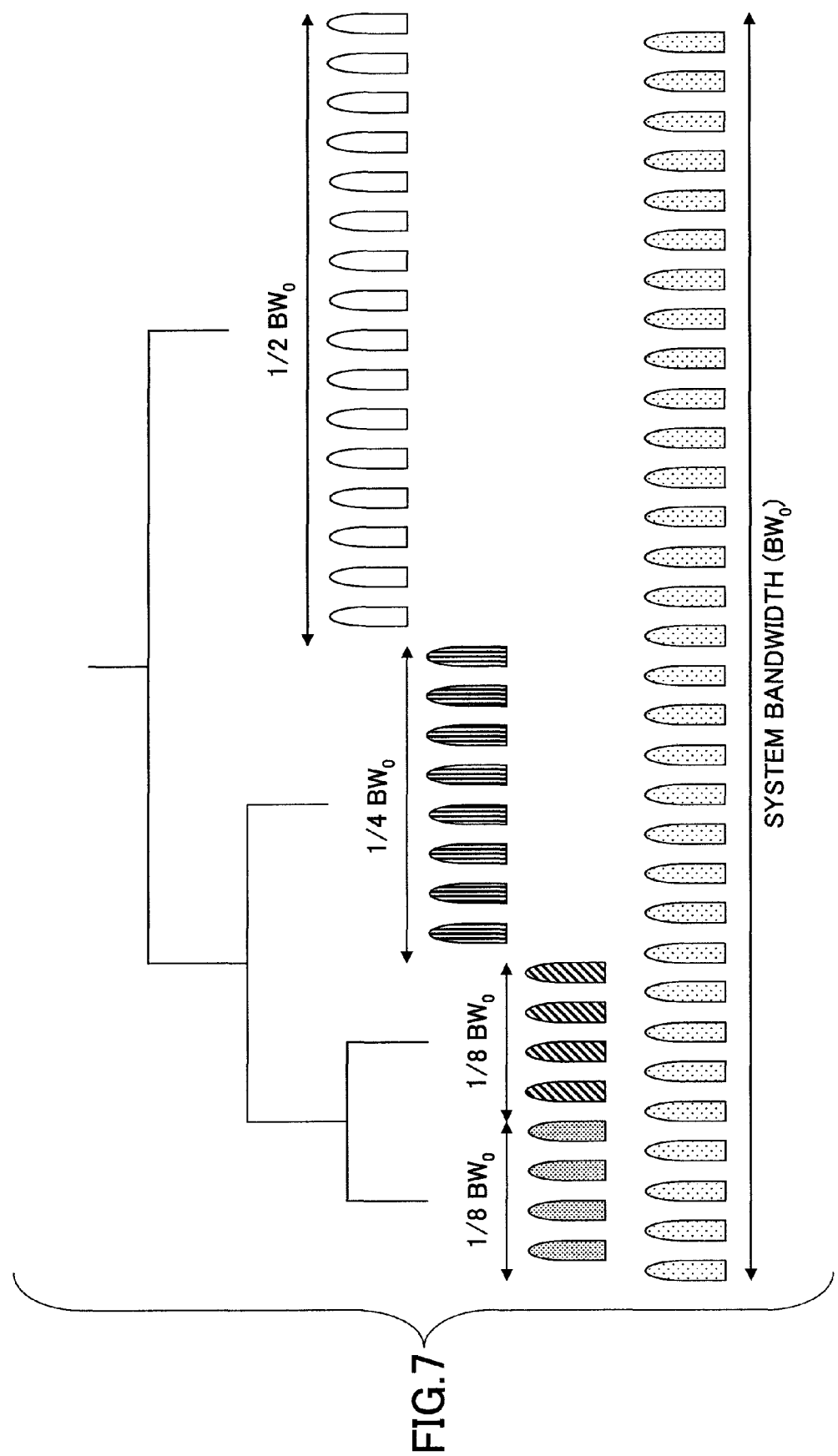
FIG. 7 is another drawing illustrating a method of allocating transmission bands for sounding reference signals according to an embodiment of the present invention.

When the number of user terminals with high path losses is small, i.e., when the number of user terminals with path losses greater than or equal to a preset path loss level is less than a predetermined value, as exemplified in FIG. 7, a combination of bandwidths that enables allocation of wide transmission bands to sounding reference signals is selected. In FIG. 7, transmission bands corresponding to hierarchical levels 1 through 3 are shown. With this combination of bandwidths, a wide transmission band with a bandwidth of $BW_0/2$ can be allocated to a user with a low path loss, and a transmission band with a bandwidth of $BW_0/8$ can be allocated to a user with a high path loss.

Figure 8:
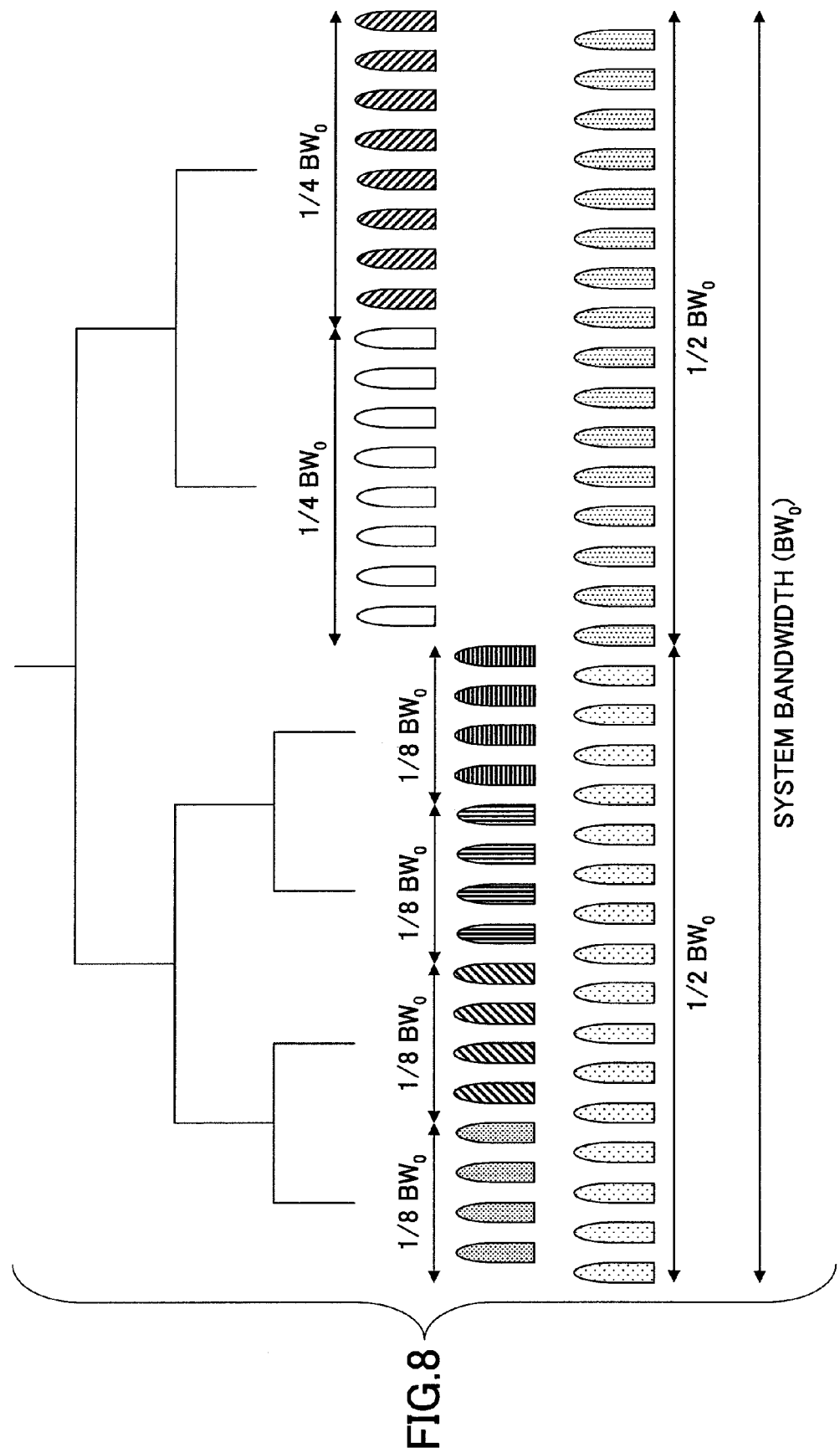
FIG. 8 is another drawing illustrating a method of allocating transmission bands for sounding reference signals according to an embodiment of the present invention.

When the number of user terminals with high path losses is large, i.e., when the number of user terminals with path losses greater than or equal to a preset path loss level is greater than or equal to a predetermined value, as exemplified in FIG. 8, a combination of bandwidths that enables allocation of narrow transmission bands to sounding reference signals is selected. In FIG. 8, transmission bands corresponding to hierarchical levels 2 and 3 are shown. With this combination of bandwidths, a narrow transmission band with a bandwidth of $BW_0/4$ can be allocated to a user with a high path loss, and a narrow transmission band with a bandwidth of $BW_0/8$ can be allocated to a user with a higher path loss.

The combinations of bandwidths shown in FIGS. 7 and 8 are just examples and may be modified as needed.

Next, the user terminal 200 of this embodiment is described with reference to FIG. 9.

The user terminal 200 includes a receiving device. The receiving device includes a transmission signal sequence generating unit 202 that receives information indicating a code for the sounding reference signal from the base station 100; a discrete Fourier transform (DFT) unit 204 that receives an output signal from the transmission signal sequence generating unit 202; a data mapping unit 206 that receives an output signal from the DFT unit 204 and receives information including a transmission bandwidth and a transmission frequency band from the base station 100; and an inverse fast Fourier transform (IFFT) unit 208 that receives an output signal from the data mapping unit 206.

The transmission signal sequence generating unit 202 generates a sounding reference signal sequence based on the received code and inputs the generated sounding reference signal sequence to the DFT unit 204.

The DFT unit 204 performs discrete Fourier transform on the sounding reference signal sequence and inputs the transformed signal sequence to the data mapping unit 206. For example, the DFT unit 204 transforms time-domain waveforms into frequency-domain waveforms.

The data mapping unit 206 maps the signal sequence to subcarriers based on the transmission bandwidth and the transmission frequency band received from the base station 100 and inputs the mapped signal sequence to the IFFT unit 208.

For example, the data mapping unit 206 maps the signal sequence to a distributed frequency block including frequency subcarriers discretely distributed in the system bandwidth based on the transmission bandwidth and the transmission frequency band.

The IFFT unit 208 performs inverse Fourier transform on the signal sequence mapped to the subcarriers and transmits the transformed signal sequence.

Next, a process in the radio communication system of this embodiment is described with reference to FIG. 10.

Each user terminal 200 measures the transmission power of a downlink pilot signal continuously being sent from the base station 100, thereby measures the path loss between the user terminal 200 and the base station 100, and reports the path loss measurement together with its maximum transmission power level to the base station 100 (step S1002). Alternatively, the user terminal 200 may be configured to report the margin (difference) between the current transmission power level of the sounding reference signal and the maximum transmission power level to the base station 100.

Next, the base station 100 selects a combination of transmission bandwidths for sounding reference signals based on the path losses between the user terminals 200 and the base station 100 and the maximum transmission power levels reported by the respective user terminals 200 (step S1004). In this step, the base station 100 selects a combination of bandwidths for sounding reference signals based on the distribution of path losses of the user terminals 200 belonging to its cell (sector). For example, when the number of user terminals with high path losses is small, the base station 100 selects a combination of bandwidths that enables allocation of wide transmission bands to many sounding reference signals as described with reference to FIG. 7. Meanwhile, when the number of user terminals with high path losses is large, the base station 100 selects a combination of bandwidths that enables allocation of narrow transmission bands to many sounding reference signals as described with reference to FIG. 8.

Then, the base station 100 determines transmission bandwidths for the respective sounding reference signals of the user terminals 200 based on the path losses between the user terminals 200 and the base station 100 and the maximum transmission power levels reported by the user terminals 200 (step S1006).

After step S1006, the base station 100 determines transmission frequency bands and codes for the respective sounding reference signals of the user terminals 200 (step S1008). For example, the base station 100 determines transmission bandwidths, transmission frequency bands, and codes for the sounding reference signals at predetermined intervals. Also, for example, the base station 100 assigns codes such that the sounding reference signals of the user terminals 200 are orthogonalized on the frequency axis.

Next, the base station 100 reports the determined transmission bandwidths, transmission frequency bands, and codes for the sounding reference signals to the respective user terminals 200 (step S1010).

Then, the user terminals 200 send the sounding reference signals using the transmission bandwidths, transmission frequency bands, and codes reported by the base station 100 (step S1012).

The base station 100 performs scheduling based on the reception quality of the sounding reference signals and allocates a transmission band to each data channel within the range of the transmission band of the sounding reference signal sent from the corresponding user terminal 200 (step S1014).

Thus, the above embodiments make it possible to extensively measure propagation path conditions (in the frequency domain) while keeping the transmission power density per unit bandwidth at a high level. This in turn makes it possible to effectively perform frequency scheduling and thereby to transmit data channels using frequency bands with good propagation path conditions.

Also, the above embodiments make it possible to efficiently allocate transmission bands to sounding reference signals without leaving unused frequency bands in the system bandwidth. Further, the above embodiments make it possible to reduce the subcarrier interval for sounding reference signals, to improve the accuracy in measuring received channel conditions, and to prevent reduction in the number of code sequences.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-001854 filed on Jan. 9, 2007, the entire contents of which are hereby incorporated herein by reference.

INDUSTRIAL APPLICABILITY

A base station, a user terminal, and a transmission control method for a sounding reference signal according to embodiments of the present invention may be applied to a radio communication system.

The invention claimed is:

1. A base station in a system where
sounding reference signals from user terminals are multiplexed using distributed FDMA in which distributed frequency blocks each including frequency subcarriers discretely distributed in a system bandwidth are allocated to the user terminals, and
the system bandwidth is repeatedly halved into frequency band segments according to a binary-tree structure,
the base station comprising:
a transmitting device,
wherein the base station is configured to determine transmission bandwidths to be allocated to the respective user terminals for transmission of the sounding reference signals based on path losses between the user terminals and the base station reported by the user terminal,
wherein the base station is configured to allocate the frequency band segments corresponding to the determined transmission bandwidths as transmission frequency bands for the sounding reference signals, and
wherein the base station is configured to report the transmission bandwidths and the transmission frequency bands to the respective user terminals.

2. The base station as claimed in claim 1, wherein the base station is configured to allocate the transmission bandwidths represented by $BW_0/2^n$ to the respective user terminals, where $BW_0$ indicates the system bandwidth and n (n is an integer greater than 0) indicates one of hierarchical levels in the binary tree structure.

3. The base station as claimed in claim 1, wherein
the user terminals are configured to report maximum transmission power levels; and
the base station is configured to determine the transmission bandwidths to be allocated to the respective user terminals for transmission of the sounding reference signals based on the reported maximum transmission power levels.

4. The base station as claimed in claim 1, wherein
the user terminals are configured to report margins between transmission power levels of the sounding reference signals and maximum transmission power levels; and
the base station is configured to determine the transmission bandwidths to be allocated to the respective user terminals for transmission of the sounding reference signals based on the reported margins between the transmission power levels of the sounding reference signals and the maximum transmission power levels.

5. The base station as claimed in claim 2,
wherein the base station is configured to select one of plural combinations of bandwidths for the sounding reference signals based on a distribution of the path losses, the combinations of the bandwidths for the sounding reference signals corresponding to different combinations of the hierarchical levels,
wherein the base station is configured to determine the transmission bandwidths to be allocated to the respective user terminals for transmission of the sounding reference signals based on the selected one of the combinations of the bandwidths.

6. The base station as claimed in claim 5, wherein the base station is configured
to select a combination of bandwidths that enables allocation of wide transmission bands for the sounding reference signals when a number of the user terminals with path losses greater than or equal to a preset path loss level is less than a predetermined value; and to select a combination of bandwidths that enables allocation of narrow transmission bands narrower than the wide transmission bands for the sounding reference signals when a number of the user terminals with path losses greater than or equal to the preset path loss level is greater than or equal to the predetermined value.

7. A user terminal in a system where a sounding reference signal from the user terminal is multiplexed using distributed FDMA in which a distributed frequency block including frequency subcarriers discretely distributed in a system bandwidth is allocated to the user terminal, the system bandwidth is repeatedly halved into frequency band segments according to a binary-free structure, a transmission bandwidth to be allocated to the user terminal for transmission of the sounding reference signal is determined based on a path loss between the user terminal and a base station reported by the user terminal, and one of the frequency band segments corresponding to the determined transmission bandwidth is allocated as a transmission frequency band for the sounding reference signal, the user terminal comprising:

a transmitting device, wherein the user terminal is configured to map a sounding reference signal sequence to subcarriers based on the transmission bandwidth and the transmission frequency band reported by the base station.

8. A method of controlling transmission of sounding reference signals in a system where the sounding reference signals from user terminals are multiplexed using distributed FDMA in which distributed frequency blocks each including frequency subcarriers discretely distributed in a system bandwidth are allocated to the user terminals, and the system bandwidth is repeatedly halved into frequency band segments according to a binary-tree structure, the method comprising:

a reception step of receiving measurements of path losses between the user terminals and a base station from the user terminals;

a transmission bandwidth determining step of determining transmission bandwidths to be allocated to the respective user terminals for transmission of the sounding reference signals based on the measurements of the path losses;

a transmission frequency determining step of allocating the frequency band segments corresponding to the determined transmission bandwidths as transmission frequency bands for the sounding reference signals; and a transmission method reporting step of reporting the transmission bandwidths and the transmission frequency bands to the respective user terminals.

9. The base station as claimed in claim 2, wherein the user terminals are configured to report maximum transmission power levels; and the base station is configured to determine the transmission bandwidths to be allocated to the respective user terminals for transmission of the sounding reference signals based on the reported maximum transmission power levels.

10. The base station as claimed in claim 2, wherein the user terminals are configured to report margins between transmission power levels of the sounding reference signals and maximum transmission power levels; and the base station is configured to determine the transmission bandwidths to be allocated to the respective user terminals for transmission of the sounding reference signals based on the reported margins between the transmission power levels of the sounding reference signals and the maximum transmission power levels.

11. The base station as claimed in claim 3, wherein the base station is configured to select one of plural combinations of bandwidths for the sounding reference signals based on a distribution of the path losses, the combinations of the bandwidths for the sounding reference signals corresponding to different combinations of the hierarchical levels, wherein the transmission bandwidth determining unit is configured to determine the transmission bandwidths to be allocated to the respective user terminals for transmission of the sounding reference signals based on the selected one of the combinations of the bandwidths.

12. The base station as claimed in claim 4, wherein the base station is configured to select one of plural combinations of bandwidths for the sounding reference signals based on a distribution of the path losses, the combinations of the bandwidths for the sounding reference signals corresponding to different combinations of the hierarchical levels, wherein the base station is configured to determine the transmission bandwidths to be allocated to the respective user terminals for transmission of the sounding reference signals based on the selected one of the combinations of the bandwidths.

* * * * *